(12) United States Patent
Herz (10) Patent No.: US 6,934,467 B1
(45) Date of Patent: Aug. 23, 2005

(54) TRANSCODING MULTIMEDIA DATA SHUTTLE AND ARCHIVE

(75) Inventor: William S. Herz, Hayward, CA (US)

(73) Assignee: Seagate Technology, LLC, Scotts Valley, CA (US)

( * ) Notice: Subject to any disclaimer, the term of this patent is extended or adjusted under 35 U.S.C. 154(b) by 873 days.

(21) Appl. No.: 09/661,334

(22) Filed: Sep. 13, 2000

Related U.S. Application Data (60) Provisional application No. 60/153,634, filed on Sep. 13, 1999, provisional application No. 60/153,631, filed on Sep. 13, 1999.

(51) Int. Cl.$^7$ .............................. H04N 5/85; H04N 7/08
(52) U.S. Cl. ......................... 386/125; 386/124; 386/92
(58) Field of Search ............................... 386/125, 124, 386/126, 46, 1, 40, 45, 92, 109, 111, 112, 386/27, 33, 105, 106, 107, 117

(56) References Cited

U.S. PATENT DOCUMENTS

| | | |
|---|---|---|
| 4,012,787 A | 3/1977 | Van Slageren |
| 4,578,718 A | 3/1986 | Parker et al. |
| 4,863,384 A | 9/1989 | Slade |
| 5,481,509 A | 1/1996 | Knowles |
| 5,488,433 A | 1/1996 | Washino et al. .............. 52/348 |
| 5,500,936 A | 3/1996 | Allen et al. |
| 5,659,351 A | 8/1997 | Huber |
| 5,699,547 A | 12/1997 | Sato et al. |
| 5,701,186 A | 12/1997 | Huber |
| 5,724,203 A | 3/1998 | Kwoh et al. |
| 5,761,180 A | 6/1998 | Murabayashi et al. |
| 5,832,237 A | 11/1998 | Lee ............................... 52/395 |
| 5,887,145 A | 3/1999 | Harari et al. .................. 52/395 |
| 6,233,389 B1 * | 5/2001 | Barton et al. .................. 386/46 |
| 6,282,045 B1 * | 8/2001 | Glover ..................... 360/73.03 |

FOREIGN PATENT DOCUMENTS

| | | | |
|---|---|---|---|
| EP | 0 555 913 | 8/1993 | ........... G11B 25/04 |
| EP | 0 689 127 | 12/1995 | ............. G06F 3/06 |
| WO | 96 26601 | 8/1996 | ............. H04N 5/77 |

(Continued)

OTHER PUBLICATIONS

Fasciano P: "Camcutter-Pictures Direct From Lens to Disk" Image Technology (Journal of the Bksts), GB, British Kinematograph Sound and Television Society. London, vol. 78, No. 9, Oct. 1, 1996, pp. 16-18, 20, XP000628350 ISSN: 0950-2114 the whole document.

*Primary Examiner*—Robert Chevalier
(74) *Attorney, Agent, or Firm*—Morrison & Foerster LLP (57) ABSTRACT

A data shuttle and storage device comprises a hard disk drive and a plurality of analog and digital interfaces for providing inputs from various sources in different formats and providing selectively data outputs to various destinations in different formats. All the data is stored through a disk processor which provides bus arbitration, file management and the like under the control of a shuttle borne microprocessor and shuttle borne power supply, so that the shuttle provides media-independent plug-and-play mobility for data from a plurality of sources and provided to a plurality of destinations.

17 Claims, 6 Drawing Sheets

| | FOREIGN PATENT DOCUMENTS | | WO | WO 00/18108 | 3/2000 |
|----|----|----|----|----|----|
| WO | WO 99/52279 | 10/1999 | WO | 00 60918 | 10/2000 |
| WO | WO 00/07368 | 2/2000 | | | |

* cited by examiner

TRANSCODING MULTIMEDIA DATA SHUTTLE AND ARCHIVE

CROSS-REFERENCE TO RELATED APPLICATION

This application is based on U.S. Provisional Patent Application Ser. No. 60/153,634 filed on Sep. 13, 1999, and entitled APPARATUS FOR A HARD DISK BASED VCR SYSTEM and Provisional Application Ser. No. 60/153,631 filed Sep. 13, 1999, and entitled TRANSCODING MULTIMEDIA DATA SHUTTLE AND ARCHIVE, both invented by inventor William S. Herz. The priority of these provisional applications is hereby claimed, and they are incorporated by reference.

FIELD OF THE INVENTION

The present invention is related generally to digital signal processing for recording streams of digital data representing data, sound and pictures, and more specifically to methods and apparatus for utilizing a removable hard disk drive in movable data shuttle format.

BACKGROUND OF THE INVENTION

With the advent of consumer audio and video products that employ sophisticated digital processing techniques, it has become increasingly necessary to find ways to exploit the full potential of digital technology as applied to broadcast video, audio and other data oriented products. If we consider such sources of video and audio information as broadcast television stations, satellite broadcast, cable TV, videotapes and digital disks, increasingly such information is represented in a fashion suitable for manipulation by automated electronic hardware such as computers or decoders. For example, the direct video broadcast (DVD) standards address digital broadcasting from a satellite's terrestrial stations and cable TV systems. Even analog broadcasts such as normal NTSC (National Television Standards Committee) broadcasts from local stations may be captured and digitized. It is of course highly desirable to be able to store, reposition and selectively play back any of this broadcast data.

A device which performs some of these functions that all consumers are familiar with is the videocassette recorder (VCR) which uses magnetic tape to store the information. The inherently linear nature of tape leads to functions such as rewind, fast forward and pause. However, a VCR cannot both capture and play back information at the same time. Further, the quality on the tape storage medium is never especially high; and it tends to deteriorate fairly rapidly both with time and/or with repeated playing. However, VHS tapes do have the advantages of being easily transported, stored, moved from one machine to another, and used for rerecording.

Therefore, it would be highly desirable to provide these advantages in a storage device which has higher capacity and is capable of directly storing digital data. Further it would be very desirable to provide similar transportability and access to other forms of digital and analog data.

SUMMARY OF THE INVENTION

It is an objective of the invention to provide a convenient form factor storage system which is highly transportable, while capable of reproducing many hours of high quality recording on a single removable assembly.

Yet another objective of this invention is to provide high quality digital recording on a removable disk product which is controllable by human users in a familiar way.

Yet another objective of the invention is to provide for high quality digital storage of broadcast video information which provides the convenience and accessibility of tape without the associated loss of data due to wear and tape particle decay.

In summary, the apparatus described herein provides a novel and unique facility that provides for the portable storage of audio and video data for archive and shuttle transport. The portable storage device of the invention would combine by providing a hard disk drive with associated interfaces, for storage, co-deck processing, and the necessary media interfaces to achieve media-independent plug-and-play data and mobility. The storage could be temporary or permanent, and without degradation of the data because of the long term storage capacity of a hard disk drive. The storage shuttle of the invention would be portable, have low power, and essentially operate in a plug-and-play mode. The operations on the stored video and audio data would be limited only by the storage capacity and I/O bandwidth of the associated interface system. The apparatus defined herein provides for operations which are analogous to functions on commercial and home use devices which use more traditional portable media such as VHS tape and music disks; such functions could include pause, fast forward, play or the selection of a certain section within the storage media. Further, the interfaces to the portable disk storage media provided herein will provide instantaneous access to these operations for the user unlike the analogous mechanical systems. Further, the data stored will now be available on a plug-and-play basis. Therefore, the portable disk drive with its associated interfaces can serve for example as an MP3 shuttle or archive, a digital picture shuttle or archive, or a television shuttle or archive, among other examples.

In a preferred embodiment, each shuttle comprises a multi-gigabyte hard disk drive packaged with associated input and output interfaces so that the pictures, television or the like can be stored, moved or archived, and then read out in any one of a plurality of machines. In a preferred exemplary embodiment, a hard disk may be substituted for the VHS tape in a VCR; by utilizing the same form factor, the same elevator mechanism to bring the data shuttle in contact with the necessary electrical contacts and input/output interfaces can be incorporated in a modified version of a VCR, thereby providing ease of customer usage familiarity.

Other features and advantages of this invention will be apparent to a person of skill in this field who studies the following detailed description of embodiments of the invention given in conjunction with the associated drawings.

DETAILED DESCRIPTION OF THE INVENTION

The present invention contemplates a new and unique apparatus for storing, archiving and shuttling an providing easy access to continuous streams of digital information representing audio, video or similar alternative media.

FIGS. 1 through 5 provide a general overview of several exemplary embodiments of how the invention operates to store and then put out a continuous stream of data. The data may be from a video application or constant source such as would be stored by a VCR, DVD, digital camera, MP3 player, or audio tape, or even more generally could be from a PC data application or content or some alternative media source. The objective would be by implementing a hard disk based cache or shuttle system to be able to select any portion of the media cache for access on an instantaneous basis. Thus the data, not the machine, would be moved, and the data would be selectively accessible on a plug-and-play basis. Functions which users are already familiar with such as pause, rewind, fast forward and selective play and more sophisticated operations such as play fast or play slower and play in reverse could be made easily available given the properly implemented input and output paths. The data cache system thus would include a hard disk drive and associated input and output electronics. The media output can be used for display or further rerecording, for audio or video presentation or for printing, faxing, e-mail or other applications.

As presently designed, the apparatus is independent of the format of the underlying digital data stream. To apply the invention, it is only necessary that the underlying data stream be recognizable by the processor, or that appropriate analog to digital circuitry be provided at the input interfaces so that the underlying information can be properly digitized to be stored on the data shuttle of the invention.

Figure 1:
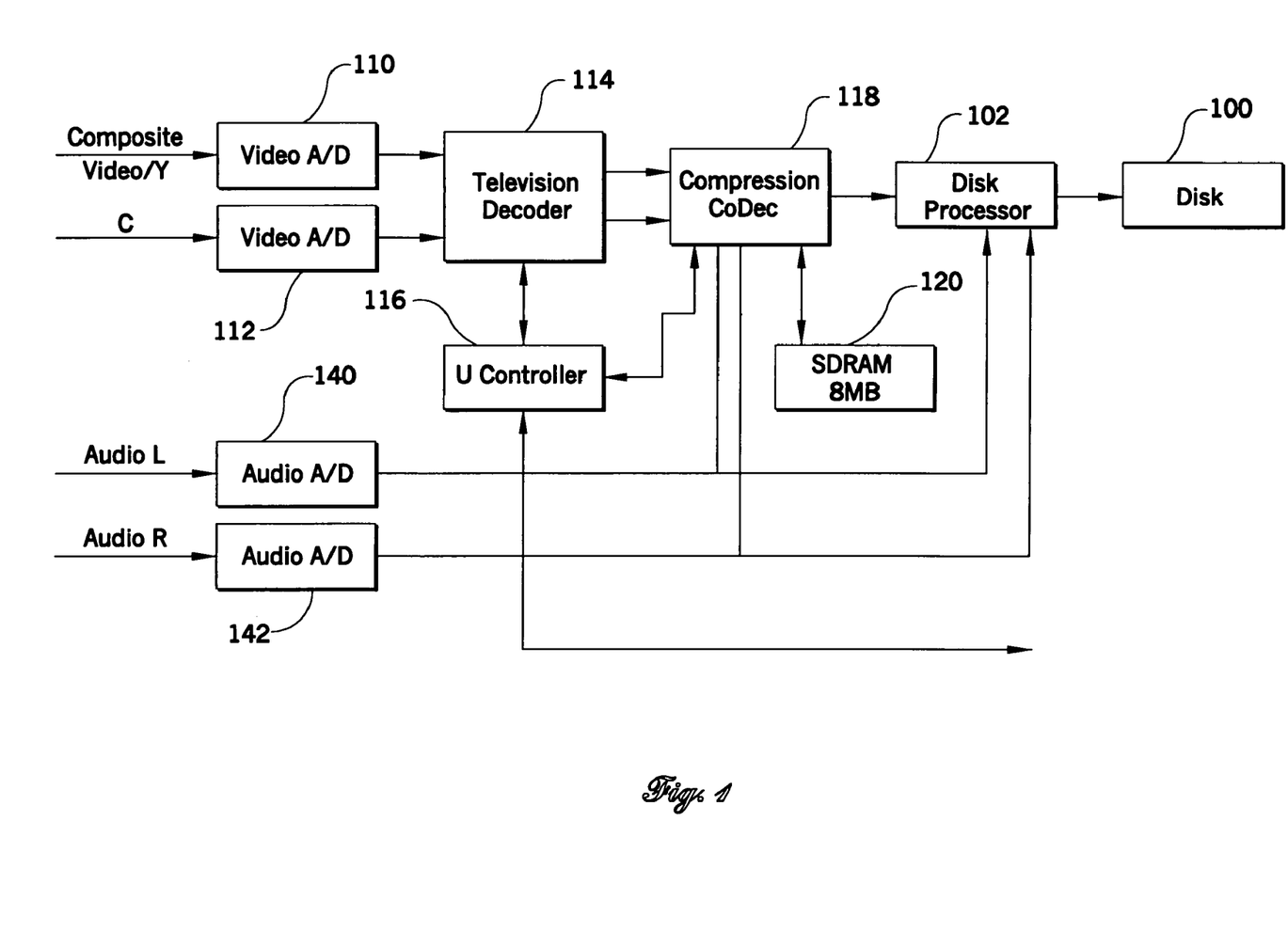
FIG. 1 is a block diagram of digitization of an incoming video and audio signal.
Figure 2:
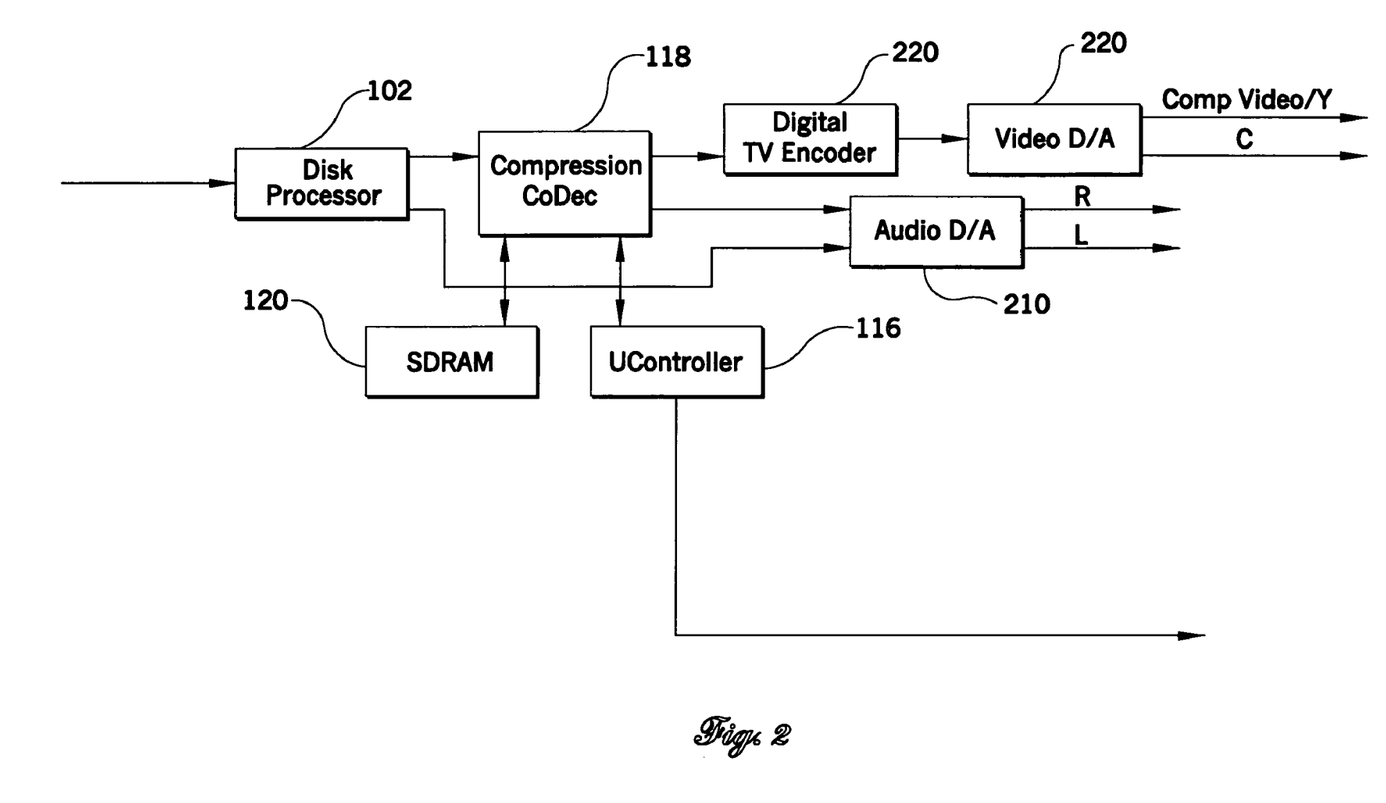
FIG. 2 is a block diagram of the output of the video and audio signal.
Figure 3:
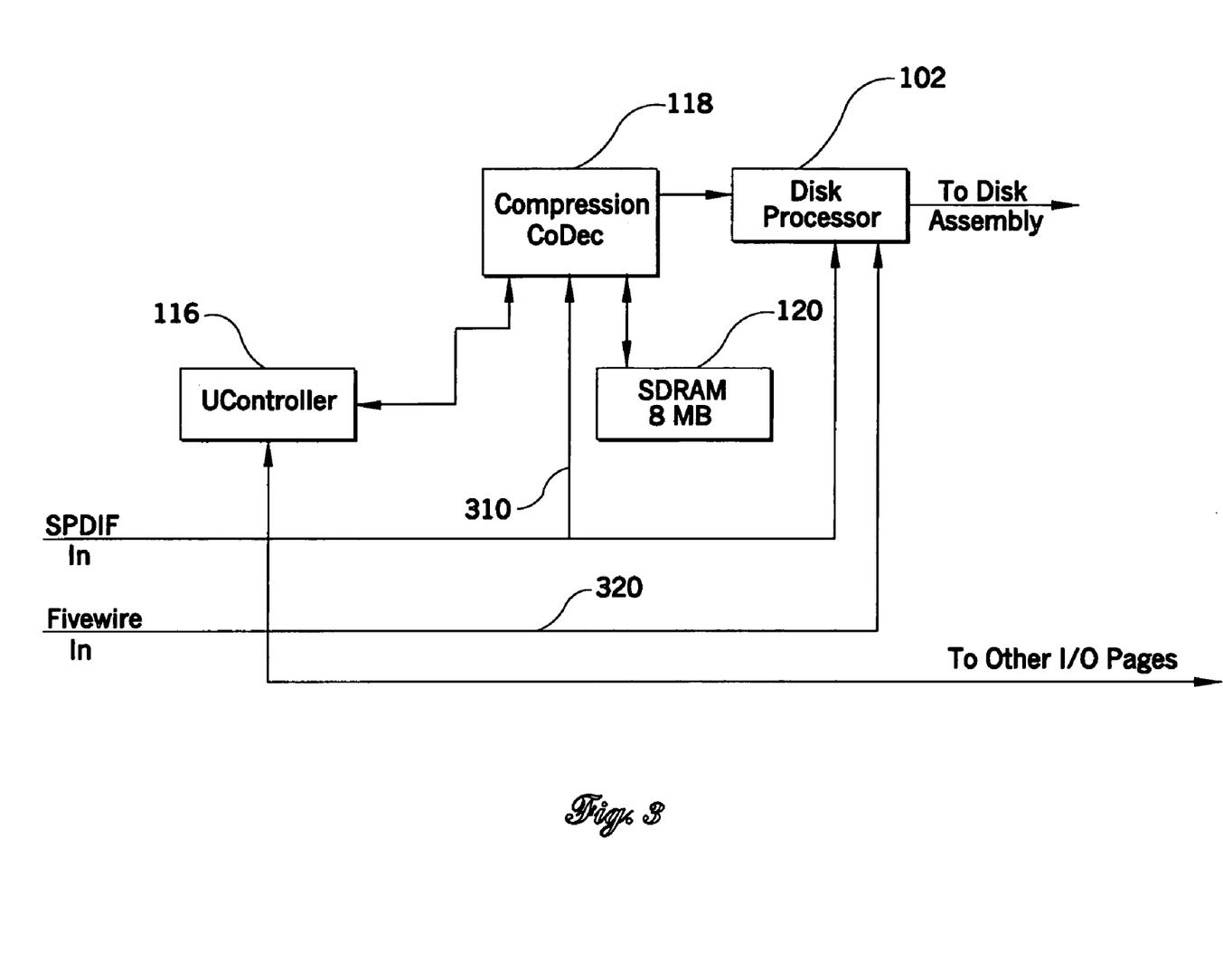
FIG. 3 is a block diagram of the digitization and storage of digital audio and compressed digital video.
Figure 4:
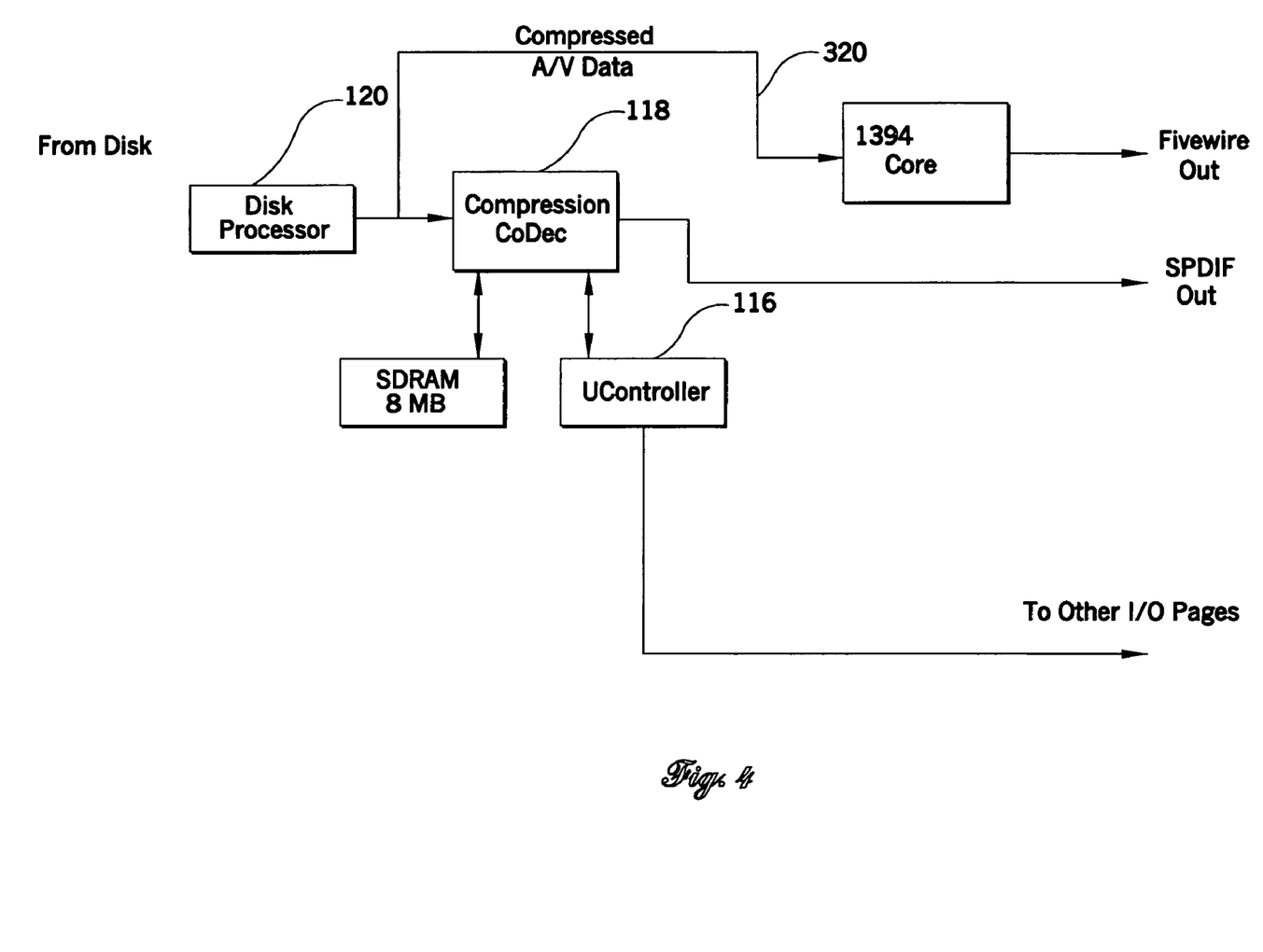
FIG. 4 is a block diagram of the output side of compressed digital video and digital audio.

FIG. 1 is a block diagram of an exemplary embodiment of the invention. The diagram shows the digitization and compression of an incoming video and audio signal so that it may be appropriately stored on a disk 100 via the disk processor 102. The input video signals are applied to A to D converters 110, 112 whose outputs are coupled to a television decoder 114 controlled by a microcontroller 116. The outputs of this decoder 114 also go to a compression CoDec 118 whose operations are controlled by the SDRAM 120. The output of the compression decoder which is now the digitized and compressed video information is applied through disk processor 102 to the disk 100, which also supplies the digitized audio received from audio A to D converters 140, 142. On the output side, as illustrated in the blocks of FIG. 2, the same disk processor 102 would be used for the necessary file management, content management, bus arbitration and streaming management. The same CoDec 118 under the cooperative control of the SDRAM 120 and the microcontroller 116 would provide the necessary decoding of the information before its transfer to the necessary audio D to A output system 210 as well as transfer of the digital data to the digital TV encoder 220 which could then pass the information on to the video D to A 222. FIG. 3 shows the elements embodied in the disk shuttle to provide the storage of digital audio and compressed digital video. Essentially, the same microcontroller is used, controlling the CoDec 118 in cooperation with the SDRAM 120 to receive and code the SPDIF input on line 310. The firewire input on line 320 is applied with the output of the CoDec 118 to the disk processor 102 for appropriate file management and the like before storage in the shuttle's disk 100. On the output side, the firewire 320 as shown can transfer bidirectionally the compressed audiovisual data directly from the disk processor 102 to the appropriate output. The SPDIF output would be received from the CoDec 118 as controlled by the microcontroller 116.

Figure 5:
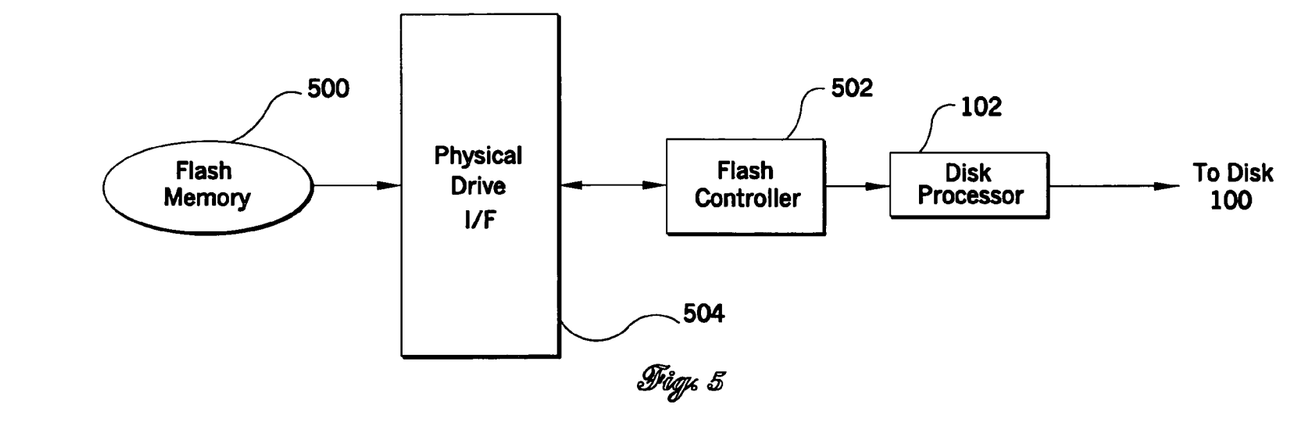
FIGS. 5 and 6 show inputs and outputs to the shuttle from a flash memory.
Figure 6:
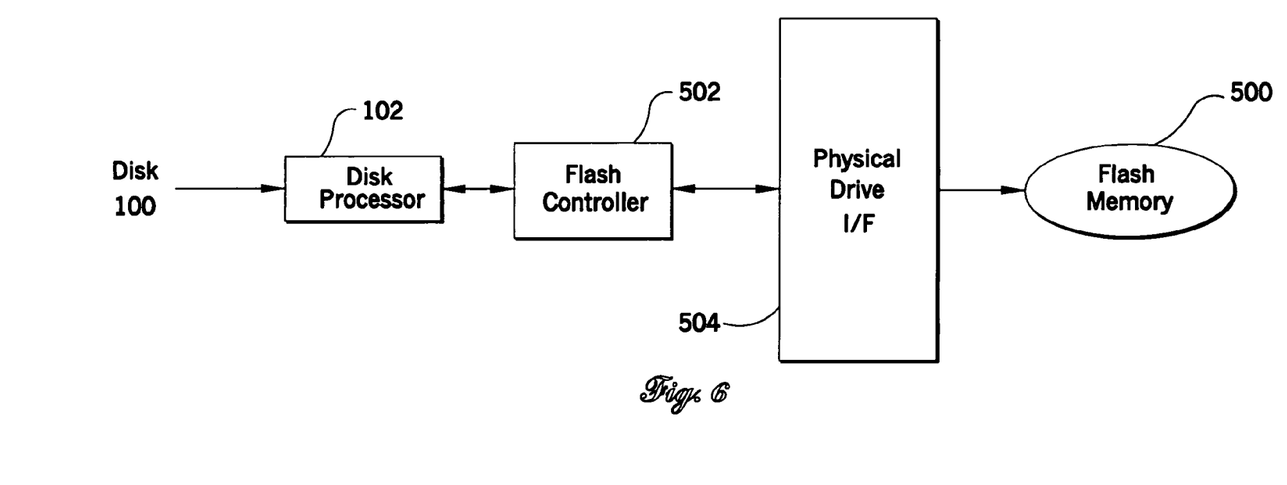

FIGS. 5 and 6 show the inputs and output to the disk through disk processor 102 from a flash memory 500. The necessary elements require simply a flash controller 502 and in some embodiments a physical drive 504.

In the preferred form of the invention, data from any of a number of sources in both digital and analog form from PCs, digital video cameras, flash memory, digital VCRs or the like can all be stored on the hard disk drive incorporated in the data shuttle and supplied to any of a number of output devices through appropriate file and bus management.

Figure 7:
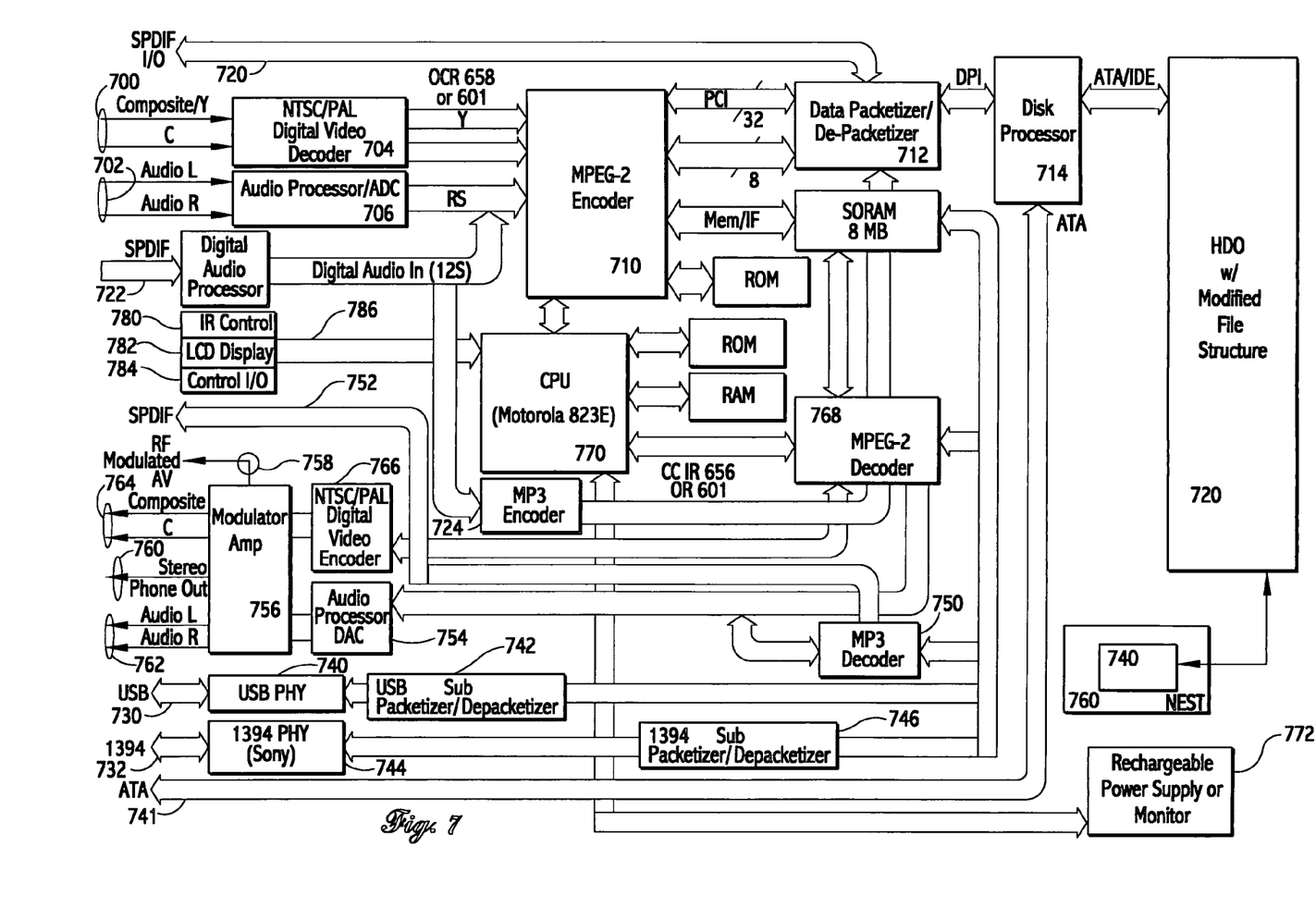
FIG. 7 is a block diagram showing the basic elements of the electronics incorporated in the data shuttle as well as in the docking station for the data shuttle.

An example of a board level system which could well be implemented by a person of skill in the art in this field and could be incorporated into the data shuttle along with a disk storage device of about one gigabyte for storage of the received filed and managed data is shown in FIG. 7.

The functions discussed with respect to FIGS. 1 through 6 to take continuous streams of digital information from a variety of sources and convey them through various interfaces incorporated into the data shuttle of this invention and convey them across a bus into a hard disk drive incorporated into a data shuttle are shown integrated onto a single board in FIG. 7. In this figure, the inputs from the various devices or sources of data are shown on the left as are the outputs to potential destinations. If the received data is in analog form, it is digitized as shown for example at the upper left where the composite TV video signals 700 and the associated audio 702 are applied to appropriate A to D converters 704, and 706 and then conveyed over buses to an MPEG-2 encoder 710. The outputs of this MPEG-2 encoder 710 are transferred through a data packetizer 712 to the disk processor 714 which does the appropriate file management, bus arbitration, content management and stream management functions so that the data can be stored on a local hard disk drive 720. In this way, any desired video input stream can be converted, digitized, processed and stored for selective access on the data shuttle.

The shuttle can also be connected across an interface to a larger hard disk drive which is incorporated in a nesting or docking device 760 for the shuttle. The disk processor 714 can then further transmit the stored digital data from the local disk drive 720 onto the nesting disk drive 740 which would have a larger capacity. In this way, the shuttle can be moved from one apparatus to another and store input data from one or several sources. The shuttle can then be rested in the nesting or docking device 760 which supports or incorporates the larger capacity disk drive 740, and some of the stored contents of the local hard disk 720 offloaded onto the larger disk 740, e.g. through ATA bus 734. When it is desired to offload or otherwise access some of the contents of the nesting device 760, the shuttle is returned to the nesting device 760 and the disk processor downloads the desired data from the nesting disk 740 onto the local hard disk 720. The shuttle operates under control of its own local processor 770 and includes a power supply and monitor 772 and controls 780–784 so that it can function independent of the dock or nest when the shuttle rests in the dock 760 and the power supply 772 can be recharged.

Among other interfaces, the shuttle also includes an input/output bus 720 operative to handle SPDIF format. This input/output bus 720 runs directly to the data packetizer 712 and then across a bus to the disk processor 714. Another SPDIF input 722 for receipt of digital audio is an input to the MPEG-2 encoder 710; the outputs of this MPEG-2 encoder are also conveyed to the disk processor 714 for storage on the local hard disk 720 or the nesting hard disk 740. This digital audio source 722 can also be applied to the MP3 encoder 724 whose outputs are connected directly to the data packetizer 712 and then to the disk processor 714, so that any data in SPDIF format can be stored and selectively accessed.

A plurality of bidirectional buses including a USB bus 730, a 1394 bus 732 and an ATA bus 734 are also provided. The USB bus 730 may provide a bidirectional connection for example to an MP3 player, a digital camera or a PC. Through a USB PHY 740, and a packetizer 742, any of these devices is coupled directly to the data packetizer 712 with their inputs and outputs then conveyed through the processor 714 to the hard disk drive 720. In similar fashion, the 1394 bus 732 could be connected to a digital video camera or a PC or a digital VCR through an appropriate PHY 744 and packetizer 746 to the data packetizer 712 and disk processor 714. Finally, the ATA bus 734 could connect a flash memory or other data storage device directly to the disk processor 714 and then to the disk drive 720.

On the output side, even as the SPDIF input 722 can be conveyed through an MP3 encoder 724 for storage, an MP3 decoder 750 is provided whose output may be coupled to an SPDIF output bus 752 or alternatively through an audio processor 754 to a modulator amp 756. This provides several alternative output lines including an RF modulated AV 758, a stereo phone output 760 and audio output 762. The audio output would more typically be used with the television output 764 which comes through the modulator amp via a digital video encoder 766 and an MPEG-2 decoder 768. The MPEG-2 decoder receives its video information from the depacketizer 712 and the disk processor 714 which as noted above can selectively access any file on the local disk 720; also, if the shuttle has been nested in the nesting device 760, then the nesting hard disk 740 is also available as a source. All of these functions are conducted under the control of the CPU 770 which in this example is Motorola 823E which is supported by a power supply 772 and monitor.

The functions are selected and the input and output sources and destinations are recognized through an IR control 780 and the selected function displayed on an LCD display 782 on the face of the shuttle. Both of these are supported through a control I/O 784 incorporated into the shuttle and controlling the functions of the CPU 770 over the bus 786.

By virtue of this set of controls and set of bus inputs, video inputs and the like, the data shuttle may be used to support and transportably enhance the limited storage capability of analog and digital electronic devices as listed above.

As an alternative example, this hard disk based shuttle could be used to emulate a conventional VHS VCR both in mechanical form factor, and with both the standard features and enhanced features, while providing compatibility with conventional tape media. In one form, this shuttle would replace the tape inside a VHS cassette shell with a light weight, low power hard disk drive. In the same way that a VHS cassette's flap is opened to expose its tape, the hard disk drive's interface is exposed as the disk drive is inserted into the VCR. Audio and video data can interface directly to the VCR digital signal processing mechanism or pass directly through the same path as conventional tape. As the cassette is lowered into its "play" position, power and ground pins protrude from the VCR's chassis and contact recessed connectors in the cassette shell.

Instead of magnetic tape coming into contact with the VCR's recording heads, the audio/video data is passed directly through to digital processing circuitry in the data shuttle, where the content is decompressed, error corrected, filtered, encoded, and converted to analog signals for display, and output as shown in FIG. 7 at lines 762–764.

The totality of the hard disk drive assembly, embedded in the VHS shell, emulates all physical elements of a VHS tape (front loading, robotic positioning, and precise alignment of electromagnetic data modulators and receptors).

This assembly and system provide mass storage for digital video and audio data. The advantages of disk storage of audio/video content is widely known (random access, clear forward/reverse scan, lossless storage, record and play back simultaneously, etc.). However, the unique benefits to this invention include but are not limited to:

Backward compatibility with existing DV or other digital tape based recorders

Convenient form factor which is highly transportable, while capable of reproducing tens of hours of high quality recording on a single removable assembly Familiar human factors—superset of VHS VCR features and human factors No time associated loss of data, due to tape particle decay, with all the benefits of tape Ability to provide firmware data (e.g. DSP code) to program/optimize media processors in anticipation of multiple video types (e.g. ATSC video formats, SD or HD)

Other uses, features and advantages of the present invention will become apparent to a person of skill in the art who studies the above invention disclosure. Therefore, the scope of the present invention is to be limited only by the following claims.

What is claimed is:

1. A data shuttle and storage device comprising a hard disk drive, and a plurality of different bus interfaces that provide inputs from various sources in various formats and that provide to various outputs input in a plurality of formats, all of said data being stored through a disk processor on said disk drive under the control of a shuttle borne microprocessor powered by a shuttle borne power supply, wherein each bus interface can be an analog or digital bus interface, so that the shuttle provides media-independent plug-and-play data mobility for data drawn from a plurality of sources and provided to a plurality of destinations, and wherein the onboard microprocessor has connected thereto a plurality of input controls accessible by a user of the shuttle to define the source of the data and/or the destination of the data.

2. The data shuttle of claim 1, further comprising a docking device associated with the data shuttle and incorporating a second, relatively high capacity disk drive, the docking device being connected across one of the interfaces to the data shuttle so that data may be stored in the hard disk drive of the docking device.

3. The data shuttle of claim 2, wherein the data from the analog and digital interfaces is transferred from the shuttle hard disk drive to the docking station hard disk drive under the control of a disk processor incorporated in the data shuttle and controlling the input bus to the hard disk drive of the data shuttle.

4. The data shuttle of claim 1, wherein the data shuttle includes its own power supply and monitor, and controls responsive to the user of the shuttle so that the data shuttle functions as an independent entity.

5. The data shuttle of claim 4, wherein the power supply of the data shuttle is rechargeable so that the data shuttle remains fully portable and independent of any permanent connection.

6. The data shuttle of claim 5, wherein the power supply of the docking device is rechargeable from the docking station.

7. The data shuttle of claim 1 including a USB bus, a 1394 bus and an ATA bus connected to the disk processor and the hard disk drive so that inputs and outputs from a digital data accessory can be stored and accessed directly over these buses.

8. A data shuttle and storage device comprising a hard disk drive, a plurality of different bus interfaces that provide inputs from various sources in various formats and that provide to various outputs input in a plurality of formats, all of said data being stored through a disk processor on said disk drive under the control of a shuttle borne microprocessor powered by a shuttle borne power supply, wherein each bus interface can be an analog or digital bus interface, so that the shuttle provides media-independent plug-and-play data mobility for data drawn from a plurality of sources and provided to a plurality of destinations, a docking device associated with the data shuttle and incorporating a second, relatively high capacity disk drive, the docking device being connected across one of the interfaces to the data shuttle so that data may be stored in the hard disk drive of the docking device.

9. The data shuttle of claim 8, wherein the data from the analog and digital interfaces is transferred from the shuttle hard disk drive to the docking station hard disk drive under the control of a disk processor incorporated in the data shuttle and controlling the input bus to the hard disk drive of the data shuttle.

10. The data shuttle of claim 8, wherein the data shuttle includes its own power supply and monitor, and controls responsive to the user of the shuttle so that the data shuttle functions as an independent entity.

11. The data shuttle of claim 10, wherein the power supply of the data shuttle is rechargeable so that the data shuttle remains fully portable and independent of any permanent connection.

12. The data shuttle of claim 11, wherein the power supply of the docking device is rechargeable from the docking station.

13. The data shuttle of claim 9, including a USB bus, a 1394 bus and an ATA bus connected to the disk processor and the hard disk drive so that inputs and outputs from a digital data accessory can be stored and accessed directly over these buses.

14. A data shuttle and storage device comprising a hard disk drive, a plurality of different bus interfaces that provide inputs from various sources in various formats and that provide to various outputs input in a plurality of formats, all of said data being stored through a disk processor on said disk drive under the control of a shuttle borne microprocessor powered by a shuttle borne power supply, wherein each bus interface can be an analog or digital bus interface, so that the shuttle provides media-independent plug-and-play data mobility for data drawn from a plurality of sources and provided to a plurality of destinations, wherein the data shuttle includes its own power supply and monitor, and controls responsive to the user of the shuttle so that the data shuttle functions as an independent entity.

15. The data shuttle of claim 14, wherein the power supply of the data shuttle is rechargeable so that the data shuttle remains fully portable and independent of any permanent connection.

16. The data shuttle of claim 14, wherein the power supply of the docking device is rechargeable from the docking station.

17. The data shuttle of claim 15, including a USB bus, a 1394 bus and an ATA bus connected to the disk processor and the hard disk drive so that inputs and outputs from a digital data accessory can be stored and accessed directly over these buses.

* * * * *